(12) United States Patent
Liou et al.

(10) Patent No.: US 9,780,862 B2
(45) Date of Patent: Oct. 3, 2017

(54) ANTENNA STRUCTURE AND WIRELESS COMMUNICATION DEVICE USING THE SAME

(71) Applicant: Chiun Mai Communication Systems, Inc., New Taipei (TW)

(72) Inventors: Geng-Hong Liou, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 205 days.

(21) Appl. No.: 14/642,091

(22) Filed: Mar. 9, 2015

(65) Prior Publication Data

US 2016/0112113 A1 Apr. 21, 2016

(30) Foreign Application Priority Data

Oct. 21, 2014 (CN) .......................... 2014 1 0560732

(51) Int. Cl.
*H01Q 1/24* (2006.01)
*H04B 7/10* (2017.01)
*H01Q 5/335* (2015.01)
*H01Q 5/328* (2015.01)
*H01Q 9/42* (2006.01)

(52) U.S. Cl.
CPC ................ *H04B 7/10* (2013.01); *H01Q 1/243* (2013.01); *H01Q 5/328* (2015.01); *H01Q 5/335* (2015.01); *H01Q 9/42* (2013.01)

(58) Field of Classification Search
CPC .......... H01Q 5/335; H01Q 1/243; H01Q 9/42; H01Q 19/005; H01Q 9/0421; H01Q 9/0442; H01L 2924/0002; H03G 1/0023; H03F 3/45179; H03F 1/56; H01F 2021/125
See application file for complete search history.

(56) References Cited

U.S. PATENT DOCUMENTS

| 2005/0068146 A1* | 3/2005 | Jessie ................ H01F 17/0006 336/200 |
| 2010/0201581 A1* | 8/2010 | Moon ................ H01Q 9/0421 343/700 MS |
| 2011/0148723 A1* | 6/2011 | Bengtsson ............ H01Q 1/243 343/745 |
| 2013/0249764 A1* | 9/2013 | Amaya .................. H01Q 1/48 343/845 |

\* cited by examiner

*Primary Examiner* — Ping Hsieh
*Assistant Examiner* — James Yang
(74) *Attorney, Agent, or Firm* — Steven Reiss (57) ABSTRACT

An antenna structure includes a feed end, a ground end, a main radiator, a coupling portion, a matching circuit, a switching circuit, and a diplexer. The main radiator is coupled to the feed end. The coupling portion is coupled to the ground end and is spaced apart from the main radiator to allow current to flow from the main radiator to the coupling portion. The switching circuit is coupled to the ground end. The diplexer includes a first port, a second port, and a third port, the first port is coupled to the feed end, the second port is coupled to a transceiver via the matching circuit, and the third port is coupled to the transceiver. The diplexer separates high frequency current from low frequency current output from the feed end, the matching circuit and the switching circuit adjust the high frequency current and the low frequency current.

12 Claims, 7 Drawing Sheets

ANTENNA STRUCTURE AND WIRELESS COMMUNICATION DEVICE USING THE SAME

FIELD

The subject matter herein generally relates to antenna structures, and particularly to a multiband antenna structure, and a wireless communication device using the same.

BACKGROUND

Multiband antennas are used in wireless communication devices such as mobile phones to receive/transmit wireless signals at different frequencies, such as wireless signals operated in a long term evolution (LTE) band.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an antenna structure and a wireless communication device using same.

Figure 1:
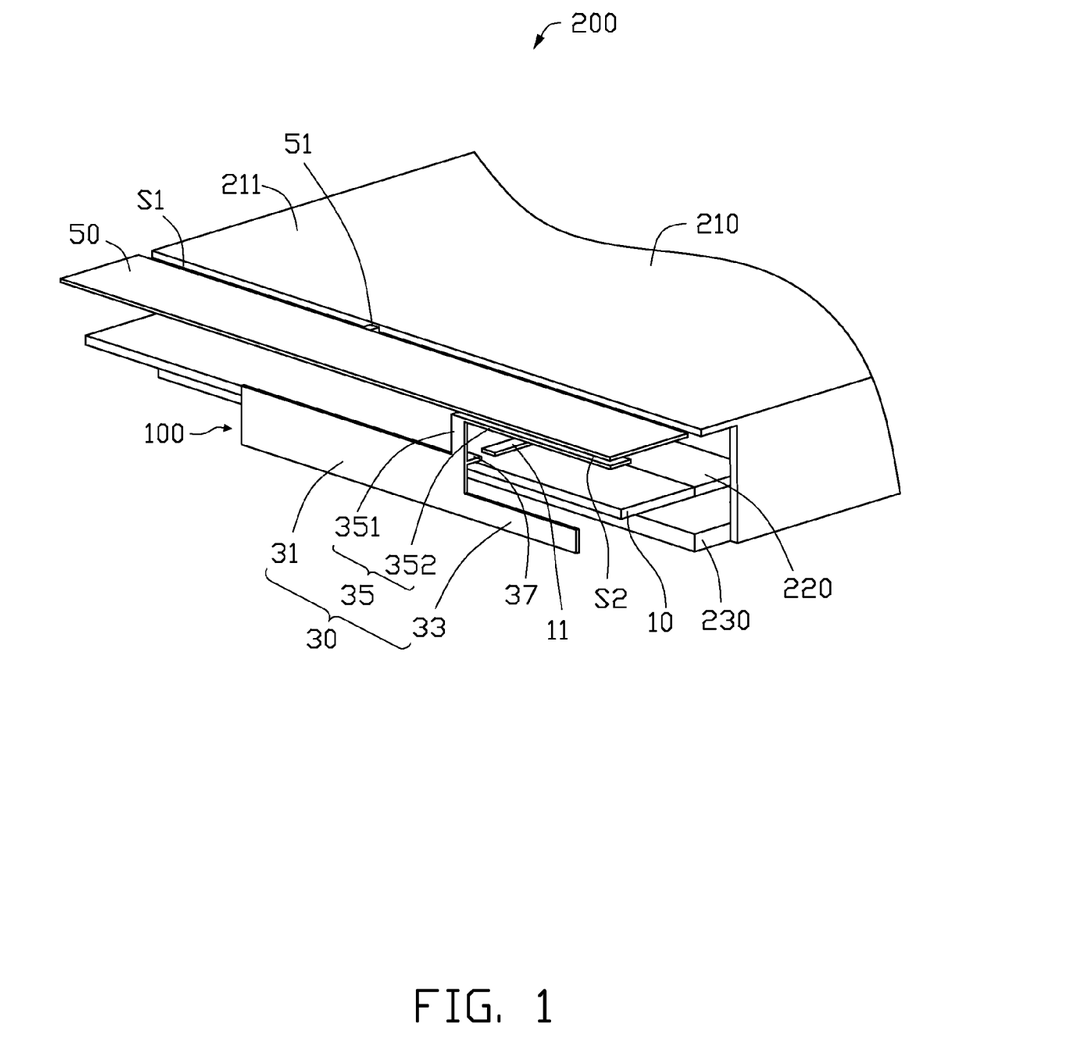
FIG. 1 is an isometric view of a wireless communication device employing an antenna structure, according to an exemplary embodiment.

FIG. 1 illustrates an embodiment of a wireless communication device 200 employing an antenna structure 100, according to an exemplary embodiment. The wireless communication device 200 can be a mobile phone, a tablet, or an intelligent watch, for example (details not shown).

The wireless communication device 200 further includes a housing 210, a baseplate 220, and a display 230. Both the baseplate 220 and the display 230 are accommodated in the housing 210. In at least one embodiment, the housing 210 is a metallic sheet. In other embodiments, the housing 210 is made of any conductive material plated or coated on plastic materials. In addition, a slit S1 is defined on the housing 210 to divide the housing 210 into a main portion 211 and a coupling portion 50 spaced from the main portion 211. The main portion 211 is substantially a U-shaped sheet, and the coupling portion 50 serves as a part of the antenna structure 100. In at least one embodiment, a width of the slit S1 is about 1 mm. Optionally, the slit S1 can be filled with rubber.

The baseplate 220 can be a printed circuit board (PCB) of the wireless communication device 200. The baseplate 220 forms a keep-out-zone 10 substantially aligned with the coupling portion 50. The purpose of the keep-out-zone 10 is to delineate an area on the baseplate 220 in which other electronic components (such as a camera, a vibrator, a speaker, etc.) cannot be placed. In at least one embodiment, the keep-out-zone 10 is disposed on an end of the baseplate 220 and is grounded via a ground section 11.

Figure 2:
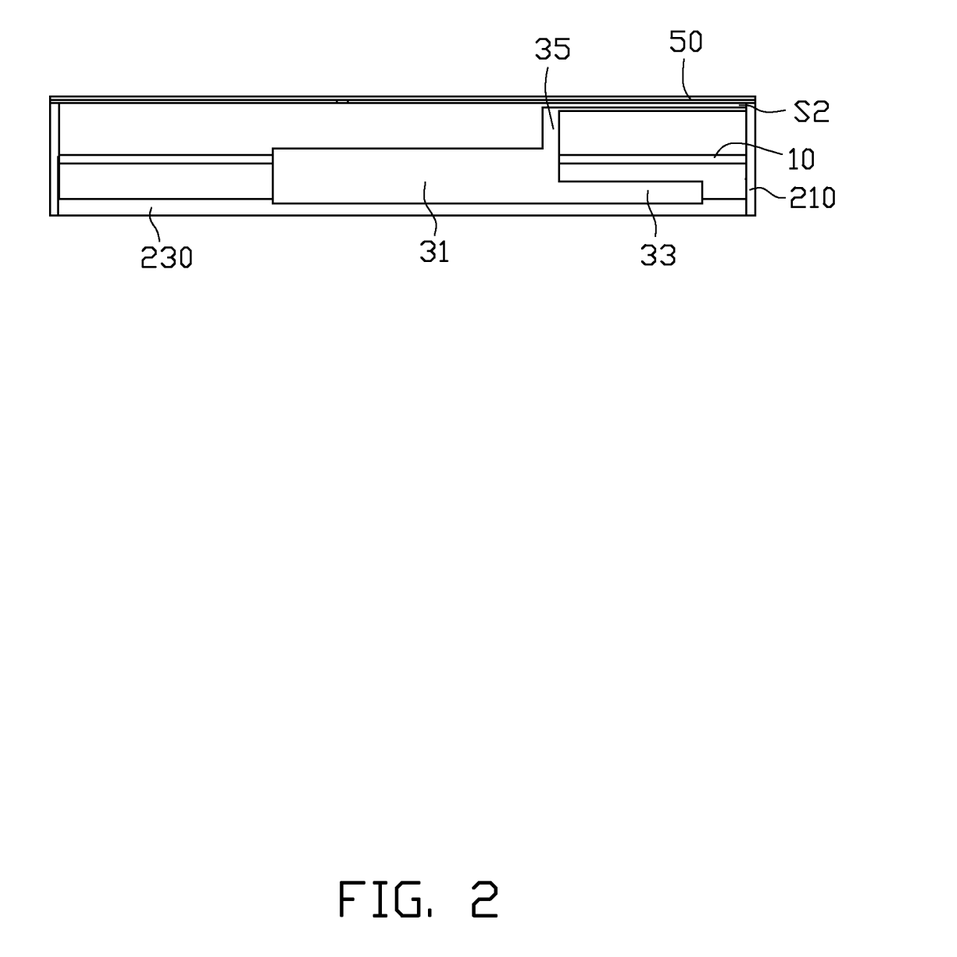
FIG. 2 is a diagrammatic view of the wireless communication device of FIG. 1.

Also referring to FIG. 2, the antenna structure 100 further includes a main radiator 30, and the main radiator 30 includes a first radiation sheet 31, a second radiation sheet 33, and a third radiation sheet 35. In at least one embodiment, the first radiation sheet 31 is substantially a rectangular sheet. The first radiation sheet 31 is perpendicularly disposed on an end of the keep-out-zone 10, and an upper edge of the first radiation sheet 31 is substantially aligned with the keep-out-zone 10. The second radiation sheet 33 extends from an end of the first radiation sheet 31 and is coplanar with the first radiation sheet 31. The third radiation sheet 33 is substantially an L-shaped sheet and includes a first connection section 351 and a second connection section 352. The first connection section 351 is connected to the upper edge of the first radiation sheet 31 and extends towards the coupling portion 50. The second connection section 352 is perpendicularly connected to a distal end of the first connection section 351 and extends parallel to the coupling portion 50. Thus, a gap S2 is defined between the second connection section 352 and the coupling portion 50 for allowing current to be coupled from the main radiator 30 to the coupling portion 50. In at least one embodiment, a width of the gap S2 is about 0.5 mm.

Additionally, a feed end 37 is perpendicularly connected to a junction of the first radiation sheet 31 and the first radiation sheet 31 to provide current to the antenna structure 100, and a ground end 51 is connected to a side of the coupling portion 50 and is laid in the slit S1 to ground the antenna structure 100.

Figure 3:
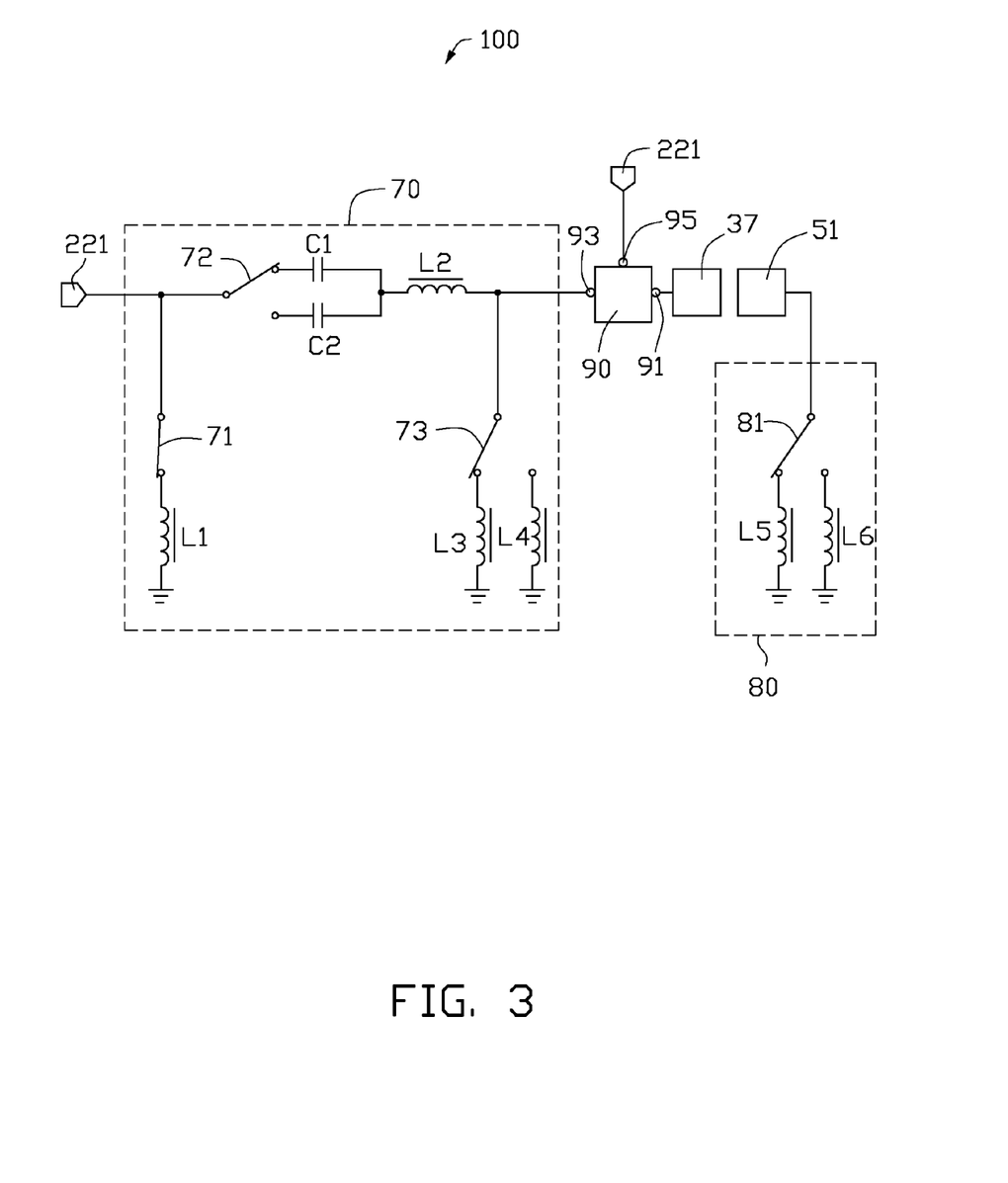
FIG. 3 is a circuit view of a matching circuit and a switching circuit of the antenna structure of FIG. 1.

FIG. 3 illustrates that the antenna structure 100 further includes a matching circuit 70, a switching circuit 80, and a diplexer 90.

The diplexer 90 is configured to separate high frequency current from low frequency current output from the feed end 37. Consequently, the high frequency current output from the feed end 37 can be directly send to a transceiver 221 of the wireless communication device 200 via the diplexer 90, and the low frequency current output from the feed end 37 can be send to the transceiver 221 via the diplexer 90 and the matching circuit 70, details of these feature will be illustrated below. The diplexer 90 includes a first port 91, a second port 93, and a third port 95. The first port 91 is electronically coupled to the feed end 37, the second port 93 is electronically coupled to the transceiver 221 via the matching circuit 70, and the third port 95 is directly and electronically coupled to the transceiver 221.

The matching circuit 70 and the switching circuit 80 are jointly configured to fine tune the high frequency current and the low frequency current. The matching circuit 70 includes a first switch 71, a second switch 72, a third switch 73, a first load component L1, a second load component C1, a third load component C2, a fourth load component L2, a fifth load component L3, and a sixth load component L4. The first switch 71 is a single pole single throw (SPST) switch, a first terminal of the first switch 71 is electronically coupled to the transceiver 221, a second terminal of the first switch 71 is switchably coupled to the first load component L1, and the first load component L1 is grounded. In at least one embodiment, the first load component L1 is an inductor with an inductance value of about 16 nH. The second switch 72 is a single pole double throw (SPDT) switch, a first terminal of the second switch 72 is electronically coupled to the transceiver 221, and a second terminal of the second switch 72 is switchably coupled to the second load component C1 and the third load component C2. The second load component C1 and the third load component C2 are electronically coupled between the second switch 72 and the fourth load component L2 in parallel, and the fourth load component L2 is electronically coupled to the second port 93 of the diplexer 90. In at least one embodiment, the second load component C1 is a capacitor with a capacitance value of about 2 pF, the third load component C2 is a capacitor with a capacitance value of about 2.5 pF, and the fourth load component L2 is an inductor with an inductance value of about 1.5 nH. The third switch 73 is a single pole double throw (SPDT) switch, a first terminal of the third switch 73 is electronically coupled to the second port 93 of the diplexer 90, and a second terminal of the third switch 73 is switchably coupled to the fifth load component L3 and the sixth load component L4, and both the fifth load component L3 and the sixth load component L4 are grounded. In at least one embodiment, the fifth load component L3 an inductor with an inductance value of about 26 nH, and the sixth load component L4 is an inductor with an inductance value of about 68 nH.

The switching circuit 80 includes a fourth switch 81, a seventh load component L5, and an eighth load component L6. The fourth switch 81 is a single pole double throw (SPDT) switch, a first terminal of the fourth switch 81 is electronically coupled to the ground end 51, and a second terminal of the fourth switch 81 is switchably coupled to the seventh load component L5 and the eighth load component L6, and both the seventh load component L5 and the eighth load component L6 are grounded. In at least one embodiment, the seventh load component L5 is an inductor with an inductance value of about 7 nH, and the eighth load component L6 is an inductor with an inductance value of about 1 nH.

In use, when high frequency current and low frequency current are input to the feed end 37, and the diplexer 90 separates the high frequency current from the low frequency current.

Figure 4:
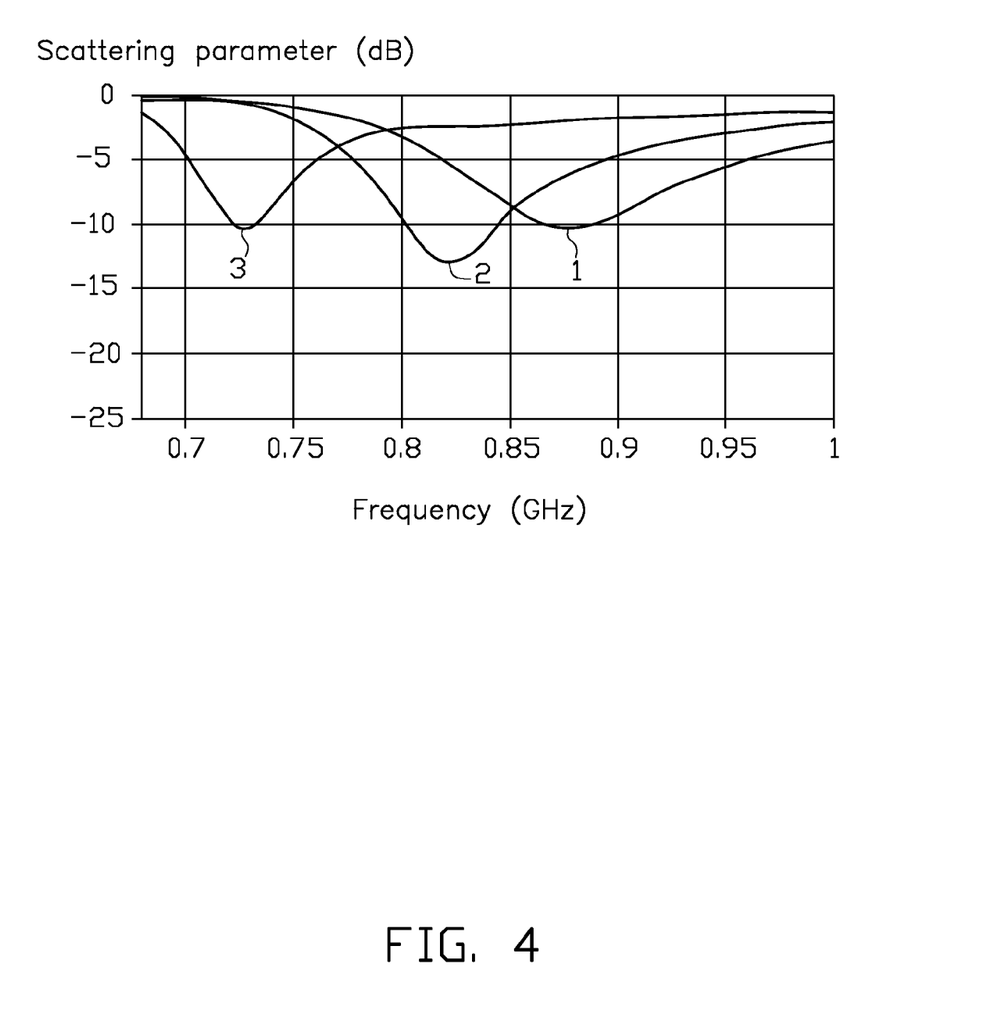
FIG. 4 is a first scattering parameter graph of the antenna structure of FIG. 1, when the wireless communication device of FIG. 1 operates at a low frequency mode.
Figure 6:
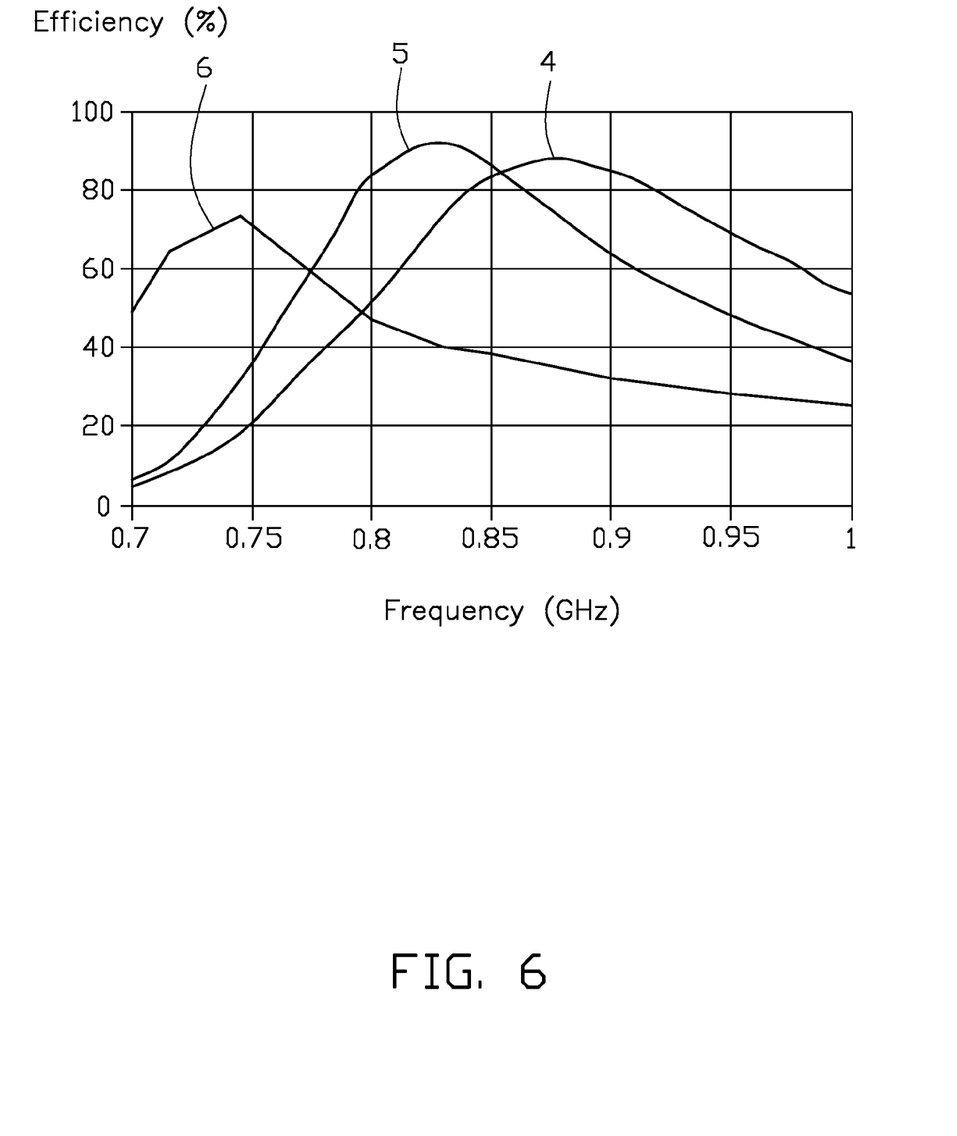
FIG. 6 is a first antenna efficiency graph of the antenna structure of FIG. 1, when the wireless communication device of FIG. 1 operates at the low frequency mode.

In detail, the low frequency current flows to the matching circuit 70 via the second port 93 of the diplexer 90, and then flows to the transceiver 221. If the first switch 71 is opened, the second switch 72 is electronically coupled to the second load component C1, the third switch 73 is electronically coupled to the fifth load component L3, and the fourth switch 81 is electronically coupled to the seventh load component L5, the antenna structure 100 can resonate a first low frequency mode, and consequently operates at GSM850/900. FIG. 4 illustrates a first scattering parameter graph of the antenna structure 100, and FIG. 6 illustrates a first antenna efficiency graph of the antenna structure 100. In view of a curve 1 shown on the FIG. 4 and a curve 4 shown on the FIG. 6, the antenna structure 100 has good performance when operating at GSM850/900.

If the first switch 71 is opened, the second switch 72 is electronically coupled to the second load component C1, the third switch 73 is electronically coupled to the sixth load component L4, and the fourth switch 81 is electronically coupled to the seventh load component L5, the antenna structure 100 can resonate a second low frequency mode, and consequently operates at LTE band20. In view of a curve 2 shown on the FIG. 4 and a curve 5 shown on the FIG. 6, the antenna structure 100 has good performance when operating at LTE band20.

If the first switch 71 is electronically coupled to first load component L1, the second switch 72 is electronically coupled to the third load component C2, the third switch 73 is opened, and the fourth switch 81 is electronically coupled to the seventh load component L5, the antenna structure 100 can resonate a third low frequency mode, and consequently operates at LTE band 17. In view of a curve 3 shown on the FIG. 4 and a curve 6 shown on the FIG. 6, the antenna structure 100 has good performance when operating at LTE band17.

Figure 5:
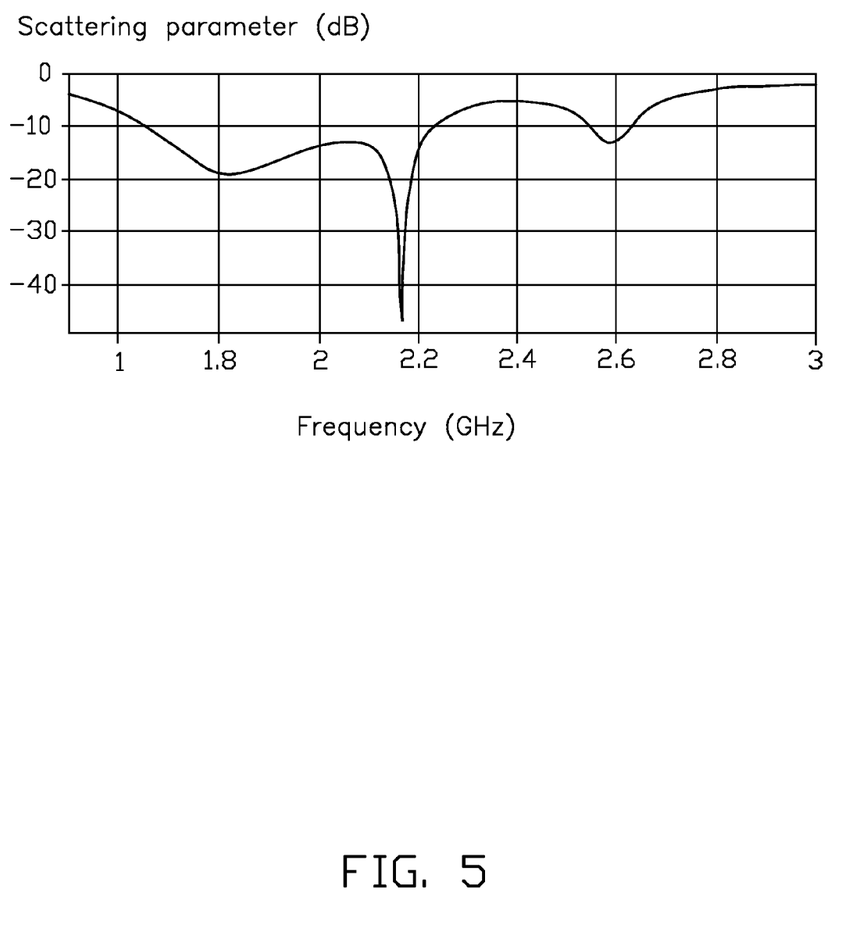
FIG. 5 is a second scattering parameter graph of the antenna structure of FIG. 1, when the wireless communication device of FIG. 1 operates at a high frequency mode.
Figure 7:
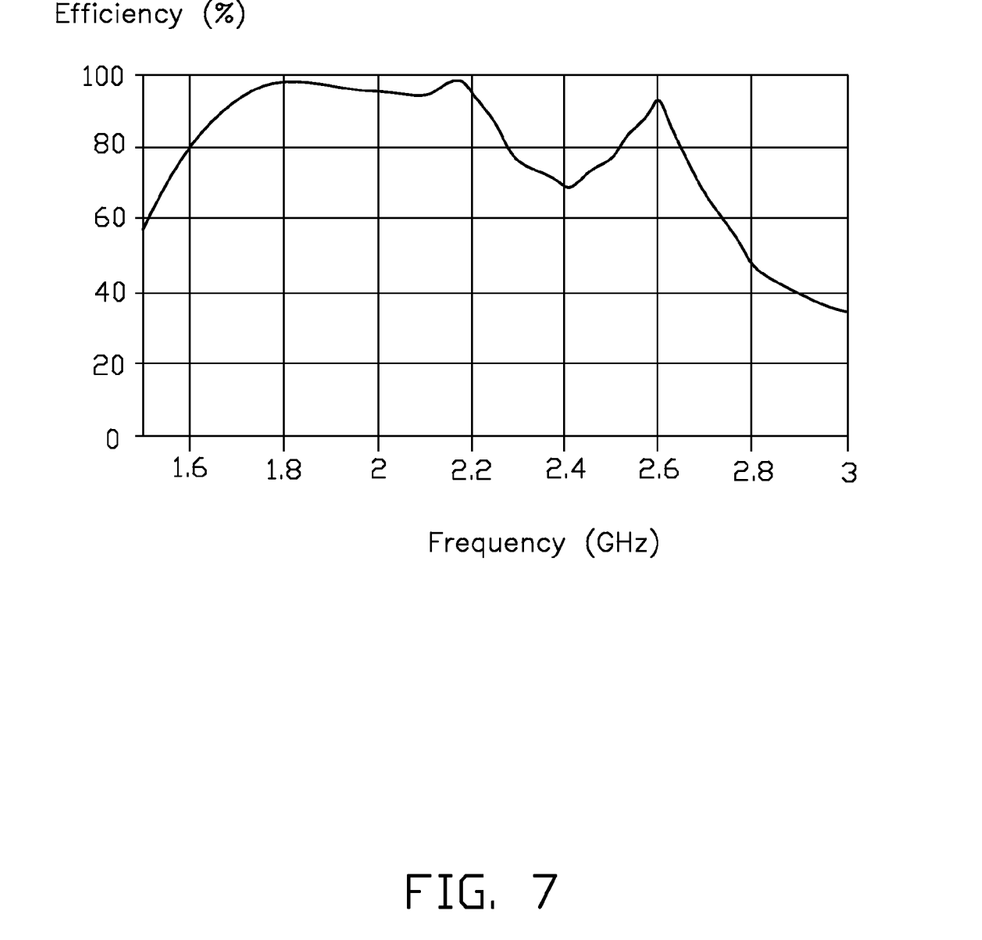
FIG. 7 is a second antenna efficiency graph of the antenna structure of FIG. 1, when the wireless communication device of FIG. 1 operates at the high frequency mode.

Additionally, the high frequency current directly flows to the transceiver 221 via the third port 93 of the diplexer 90. If the fourth switch 81 is electronically coupled to the eighth load component L6, the antenna structure 100 can resonate a first high frequency mode, and consequently operates at GSM1800/1900, UMTS2100, and LTE band7. FIG. 5 illustrates a second scattering parameter graph of the antenna structure 100, and FIG. 7 illustrates a second antenna efficiency graph of the antenna structure 100. In view of the FIG. 5 and the FIG. 7, the antenna structure 100 has good performance when operating at GSM1800/1900, UMTS2100, and LTE band7.

In other embodiments, the switching circuit 80 can be omitted. At this time, the ground end 51 is directly grounded.

In summary, the main radiator 30 is electronically coupled to the coupling portion 50, thus, the housing 210 can be served as a part of the antenna structure 100, which allows further size reductions of the wireless communication device 200 employing the antenna structure 100. Additionally, the antenna structure 100 employing the matching circuit 70, the switching circuit 80, and the diplexer 90 can be used in a plurality of (more than two) common wireless communication systems, such as GSM, WCDMA, LTE, and other 2G/3G/4G systems, with acceptable communication quality.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An antenna structure comprising:
a feed end;
a ground end;
a main radiator coupled to the feed end;
a coupling portion coupled to the ground end and spaced apart from the main radiator to allow current to flow from the main radiator to the coupling portion;
a matching circuit;
a switching circuit electronically coupled to the ground end; and
a diplexer comprising a first port electronically coupled to the feed end, a second port electronically coupled to a transceiver via the matching circuit, and a third port electronically coupled to the transceiver, the diplexer configured to separate high frequency current from low frequency current output from the feed end,
wherein the matching circuit and the switching circuit tune the high frequency current and the low frequency current;
wherein the main radiator comprises a first radiation sheet, a second radiation sheet, and a third radiation sheet, the second radiation sheet extends from an end of the first radiation sheet and is coplanar with the first radiation sheet, the third radiation sheet comprises a first connection section and a second connection section, the first connection section is connected to an edge of the first radiation sheet and extends towards the coupling portion, the second connection section is connected to a distal end of the first connection section and extends parallel to the coupling portion, the first radiation sheet is coplanar with the first radiation sheet, the second connection section is positioned at a plane perpendicular to a plane in which the first radiation sheet is positioned, and the coupling portion is positioned at a plane parallel to a plane in which the second radiation sheet is positioned.

2. The antenna structure as claimed in claim 1, wherein a gap is defined between the second connection section and the coupling portion.

3. The antenna structure as claimed in claim 1, wherein the matching circuit comprises a first switch and a first load component, the first switch is a single pole single throw (SPST) switch, a first terminal of the first switch is electronically coupled to the transceiver, a second terminal of the first switch is switchably coupled to the first load component, and the first load component is grounded.

4. The antenna structure as claimed in claim 3, wherein the matching circuit further comprises a second switch, a second load component, a third load component, and a fourth load component, the second switch is a single pole double throw (SPDT) switch, a first terminal of the second switch is electronically coupled to the transceiver, and a second terminal of the second switch is switchably coupled to the second load component and the third load component, the second load component and the third load component are electronically coupled between the second switch and the fourth load component in parallel, and the fourth load component is electronically coupled to the second port of the diplexer.

5. The antenna structure as claimed in claim 4, wherein the matching circuit further comprises a third switch, a fifth load component, and a sixth load component, the third switch is a single pole double throw (SPDT) switch, a first terminal of the third switch is electronically coupled to the second port of the diplexer, and a second terminal of the third switch is switchably coupled to the fifth load component and the sixth load component, and both the fifth load component and the sixth load component are grounded.

6. The antenna structure as claimed in claim 1, wherein the switching circuit comprises a fourth switch, a seventh load component, and an eighth load component, the fourth switch is a single pole double throw (SPDT) switch, a first terminal of the fourth switch is electronically coupled to the ground end, and a second terminal of the fourth switch is switchably coupled to the seventh load component and the eighth load component, and both the seventh load component and the eighth load component are grounded.

7. A wireless communication device comprising:
a housing defining a slit configured to divide the housing into a main portion and a coupling portion spaced from the main portion;
a transceiver; and
an antenna structure comprising
a feed end;
a ground end coupled to the coupling portion;
a main radiator coupled to the feed end and spaced apart from the main portion to allow current to flow from the main radiator to the coupling portion;
a matching circuit; and
a diplexer comprising a first port electronically coupled to the feed end, a second port electronically coupled to the transceiver via the matching circuit, and a third port directly and electronically coupled to the transceiver, the diplexer configured to separate high frequency current from low frequency current output from the feed end, and configured to output the high frequency current to the transceiver and output the low frequency current to the transceiver via the matching circuit, the matching circuit configured to adjust the low frequency current;
wherein the main radiator comprises a first radiation sheet, a second radiation sheet, and a third radiation sheet, the second radiation sheet extends from an end of the first radiation sheet and is coplanar with the first radiation sheet, the third radiation sheet comprises a first connection section and a second connection section, the first connection section is connected to an edge of the first radiation sheet and extends towards the coupling portion, the second connection section is connected to a distal end of the first connection section and extends parallel to the coupling portion, the first radiation sheet is coplanar with the first radiation sheet, the second connection section is positioned at a plane perpendicular to a plane in which the first radiation sheet is positioned, and the coupling portion is positioned at a plane parallel to a plane in which the second radiation sheet is positioned.

8. The wireless communication device as claimed in claim 7, wherein a gap is defined between the second connection section and the coupling portion.

9. The wireless communication device as claimed in claim 7, wherein the matching circuit comprises a first switch and a first load component, the first switch is a single pole single throw (SPST) switch, a first terminal of the first switch is electronically coupled to the transceiver, a second terminal of the first switch is switchably coupled to the first load component, and the first load component is grounded.

10. The wireless communication device as claimed in claim 9, wherein the matching circuit further comprises a second switch, a second load component, a third load component, and a fourth load component, the second switch is a single pole double throw (SPDT) switch, a first terminal of the second switch is electronically coupled to the transceiver, and a second terminal of the second switch is switchably coupled to the second load component and the third load component, the second load component and the third load component are electronically coupled between the second switch and the fourth load component in parallel, and the fourth load component is electronically coupled to the second port of the diplexer.

11. The wireless communication device as claimed in claim 10, wherein the matching circuit further comprises a third switch, a fifth load component, and a sixth load component, the third switch is a single pole double throw (SPDT) switch, a first terminal of the third switch is electronically coupled to the second port of the diplexer, and a second terminal of the third switch is switchably coupled to the fifth load component and the sixth load component, and both the fifth load component and the sixth load component are grounded.

12. The wireless communication device as claimed in claim 7, wherein the antenna structure further comprises a switching circuit, the switching circuit comprises a fourth switch, a seventh load component, and an eighth load component, the fourth switch is a single pole double throw (SPDT) switch, a first terminal of the fourth switch is electronically coupled to the ground end, and a second terminal of the fourth switch is switchably coupled to the seventh load component and the eighth load component, and both the seventh load component and the eighth load component are grounded.

* * * * *